(12) United States Patent
Pignataro et al.

(10) Patent No.: US 10,887,230 B2
(45) Date of Patent: Jan. 5, 2021

(54) IN-SITU OPERATIONS, ADMINISTRATION, AND MANAGEMENT (IOAM) AND NETWORK EVENT CORRELATION FOR INTERNET OF THINGS (IOT)

(71) Applicant: Cisco Technology, Inc., San Jose, CA (US)

(72) Inventors: Carlos M. Pignataro, Cary, NC (US); Nagendra Kumar Nainar, Morrisville, NC (US); Rajiv Asati, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 328 days.

(21) Appl. No.: 15/907,020

(22) Filed: Feb. 27, 2018

(65) Prior Publication Data

US 2019/0268267 A1 Aug. 29, 2019

(51) Int. Cl.
*H04L 12/749* (2013.01)
*H04W 72/04* (2009.01)
*H04L 12/721* (2013.01)
*H04L 12/725* (2013.01)

(52) U.S. Cl.
CPC ............ *H04L 45/741* (2013.01); *H04L 45/72* (2013.01); *H04W 72/0446* (2013.01); *H04L 2212/00* (2013.01)

(58) Field of Classification Search
None
See application file for complete search history.

(56) References Cited

U.S. PATENT DOCUMENTS

| | | | |
|---|---|---|---|
| 2005/0114739 A1* | 5/2005 | Gupta | G06F 11/008 714/39 |
| 2011/0222412 A1* | 9/2011 | Kompella | H04L 45/00 370/241.1 |
| 2013/0089090 A1* | 4/2013 | Binetti | H04L 69/08 370/389 |
| 2014/0092751 A1* | 4/2014 | Meilik | H04L 43/0811 370/241.1 |

(Continued)

*Primary Examiner* — Jeffrey M Rutkowski
*Assistant Examiner* — Ning Li
(74) *Attorney, Agent, or Firm* — Behmke Innovation Group; James M. Behmke; Jonathon P. Western

(57) ABSTRACT

In an embodiment, a computer implemented method comprises at an internetworking device that is logically located in an edge position with respect to an internet protocol network and a plurality of industrial devices, receiving packet and frame data from a first computing device that is associated with an industrial system and communicates using a device-level Ethernet data communication protocol that does not define a management layer; at the internetworking device, generating an Operations, Administration, Management (OAM) header using, at least in part, the packet and frame data, wherein the OAM header comprises a device identifier, a data type, and a variable; encapsulating the packet and frame data with the OAM header to generate encapsulated packet and frame data; storing the encapsulated packet and frame data in a database; sending the encapsulated packet and frame data to a second internetworking device that is associated with the industrial system and communicates using the device-level Ethernet data communication protocol that does not define a management layer.

24 Claims, 6 Drawing Sheets

(56) References Cited

U.S. PATENT DOCUMENTS

| | | | |
|---|---|---|---|
| 2014/0211657 A1* | 7/2014 | Balasubramanian | ........................ H04L 41/0803 370/254 |
| 2017/0250907 A1* | 8/2017 | Pignataro | ................ H04L 45/74 |
| 2018/0069773 A1* | 3/2018 | Verma | .................. H04L 67/327 |
| 2018/0167307 A1* | 6/2018 | Barry | ...................... H04L 45/48 |
| 2018/0331890 A1* | 11/2018 | Song | ....................... H04L 41/08 |
| 2018/0331933 A1* | 11/2018 | Song | ................... H04L 45/745 |
| 2019/0041824 A1* | 2/2019 | Chavez | .................. H04L 67/04 |

\* cited by examiner

FIG. 3
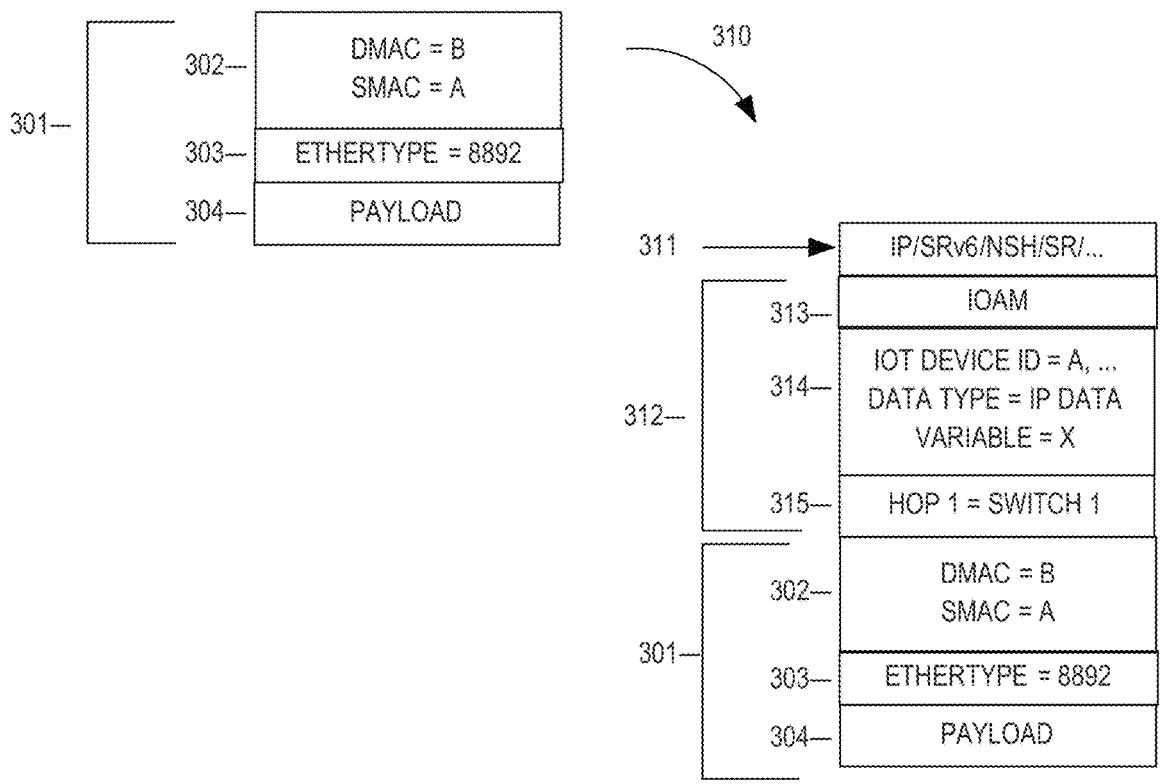
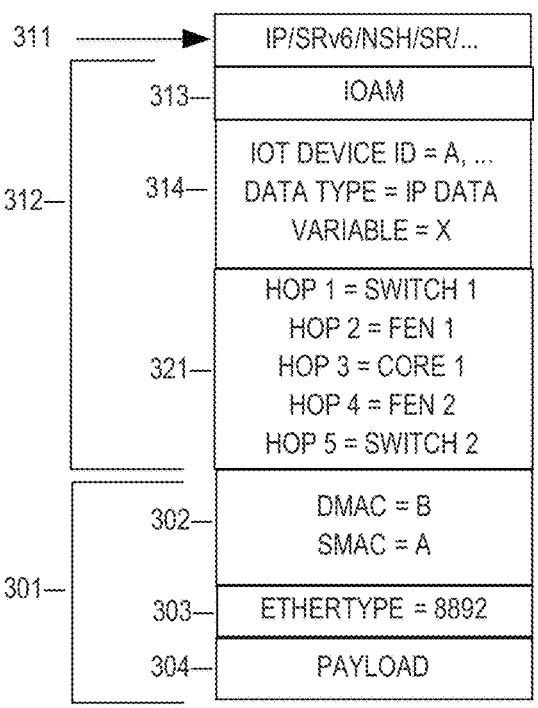

FIG. 4A

402 AT AN INTERNETWORKING DEVICE THAT IS LOGICALLY LOCATED IN AN EDGE POSITION WITH RESPECT TO AN INTERNET PROTOCOL NETWORK AND A PLURALITY OF INDUSTRIAL DEVICES, RECEIVING PACKET AND FRAME DATA FROM A FIRST COMPUTING DEVICE THAT IS ASSOCIATED WITH AN INDUSTRIAL SYSTEM AND COMMUNICATES USING A DEVICE-LEVEL ETHERNET DATA COMMUNICATION PROTOCOL THAT DOES NOT DEFINE A MANAGEMENT LAYER

404 AT THE INTERNETWORKING DEVICE, GENERATING AN OPERATIONS, ADMINISTRATION, MANAGEMENT (OAM) HEADER USING, AT LEAST IN PART, THE PACKET AND FRAME DATA, WHEREIN THE OAM HEADER COMPRISES A DEVICE IDENTIFIER, A DATA TYPE, AND A VARIABLE

406 ENCAPSULATING THE PACKET AND FRAME DATA WITH THE OAM HEADER TO GENERATE ENCAPSULATED PACKET AND FRAME DATA

408 STORING THE ENCAPSULATED PACKET AND FRAME DATA IN A DATABASE

410 SENDING THE ENCAPSULATED PACKET AND FRAME DATA TO A SECOND INTERNETWORKING DEVICE THAT IS ASSOCIATED WITH THE INDUSTRIAL SYSTEM AND COMMUNICATES USING THE DEVICE-LEVEL ETHERNET DATA COMMUNICATION PROTOCOL THAT DOES NOT DEFINE A MANAGEMENT LAYER

FIG. 4B

412 RECEIVING PATH DATA THROUGH STREAMING TELEMETRY AND CONSOLIDATING THE PATH DATA USING AT LEAST THE FIRST TRACE IDENTIFIER AND THE SECOND ONE OR MORE TRACE IDENTIFIERS OF THE SECOND OAM HEADER

414 RECEIVING AND IDENTIFYING AN ALARM MESSAGE BASED ON AN ALARM DATA TYPE OF THE FIRST OAM HEADER AND IDENTIFYING AN ALARM TIMESTAMP ASSOCIATED WITH THE ALARM MESSAGE BASED ON THE DEVICE IDENTIFIER OF THE FIRST OAM HEADER

416 IDENTIFYING, USING THE PATH DATA, NETWORK EVENTS WITH EVENT TIMESTAMPS THAT ARE WITHIN A TEMPORAL PROXIMITY TO THE ALARM TIMESTAMP

418 CORRELATING THE NETWORK EVENTS USING THE ALARM TIMESTAMP AND THE PATH DATA TO IDENTIFY AN ALARM EVENT AS A CAUSE OF THE ALARM MESSAGE

IN-SITU OPERATIONS, ADMINISTRATION, AND MANAGEMENT (IOAM) AND NETWORK EVENT CORRELATION FOR INTERNET OF THINGS (IOT)

TECHNICAL FIELD

The technical field of the present disclosure relates to improved methods, systems, computer software, and/or computer hardware in the field of network communication. The disclosure relates more specifically to improved computer-implemented methods and systems for applying In-situ or in-band Operations, Administration, and Management (IOAM) to ethernet data communications between Internet of Things (IoT) devices in order to correlate network events while improving the use of network bandwidth and processing efficiency. Certain embodiments are useful in processing and tracking data to and from IoT devices that use ethernet communication protocols, including industrial IoT devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The development and deployment of internet of things (IoT) devices has proceeded with remarkable speed in the past several years. IoT devices are diverse, including everything from controllers of industrial equipment to smart watches and personal activity monitors. However, network communication technologies have not kept pace with the huge number and wide use of these devices. Some analysts estimate that billions of such devices will be operating, connected to, and communicating through internetworks within a few years, but there is presently no effective means of quickly and efficiently conveying information to network devices that are essential for facilitating communication between IoT devices. Key constraints in this technical field have included limited processing power and network bandwidth.

Traditionally, communication between IoT devices involves using network devices such as switches and routers to send packets over a network. For network devices to effectively forward packets to their proper destinations, the various packet encapsulations are decapsulated such that the forwarding and priority information is accessible, and then encapsulated again for sending. The process of encapsulating and decapsulating uses processing resources, such as CPU cycles. Moreover, network management, monitoring, and troubleshooting traditionally involves processing and sending network data to monitoring devices using out-of-band channels, which uses additional network bandwidth.

Therefore, there is a need for improved in-band network communication technologies that enables efficient packet forwarding, tracking, and monitoring while reducing the use of processing resources and network bandwidth. There is also a need for such improvements to network communication to be backwards compatible with existing network devices.

SUMMARY

The appended claims may serve as a summary of the invention.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 depicts a protocol data unit (PDU) workflow, in an example embodiment.

FIG. 4A depicts a method or algorithm for applying IOAM to Ethernet communication, in an example embodiment.

FIG. 4B depicts a method or algorithm for applying IOAM to Ethernet communication, in an example embodiment.

DETAILED DESCRIPTION

Figure 1:
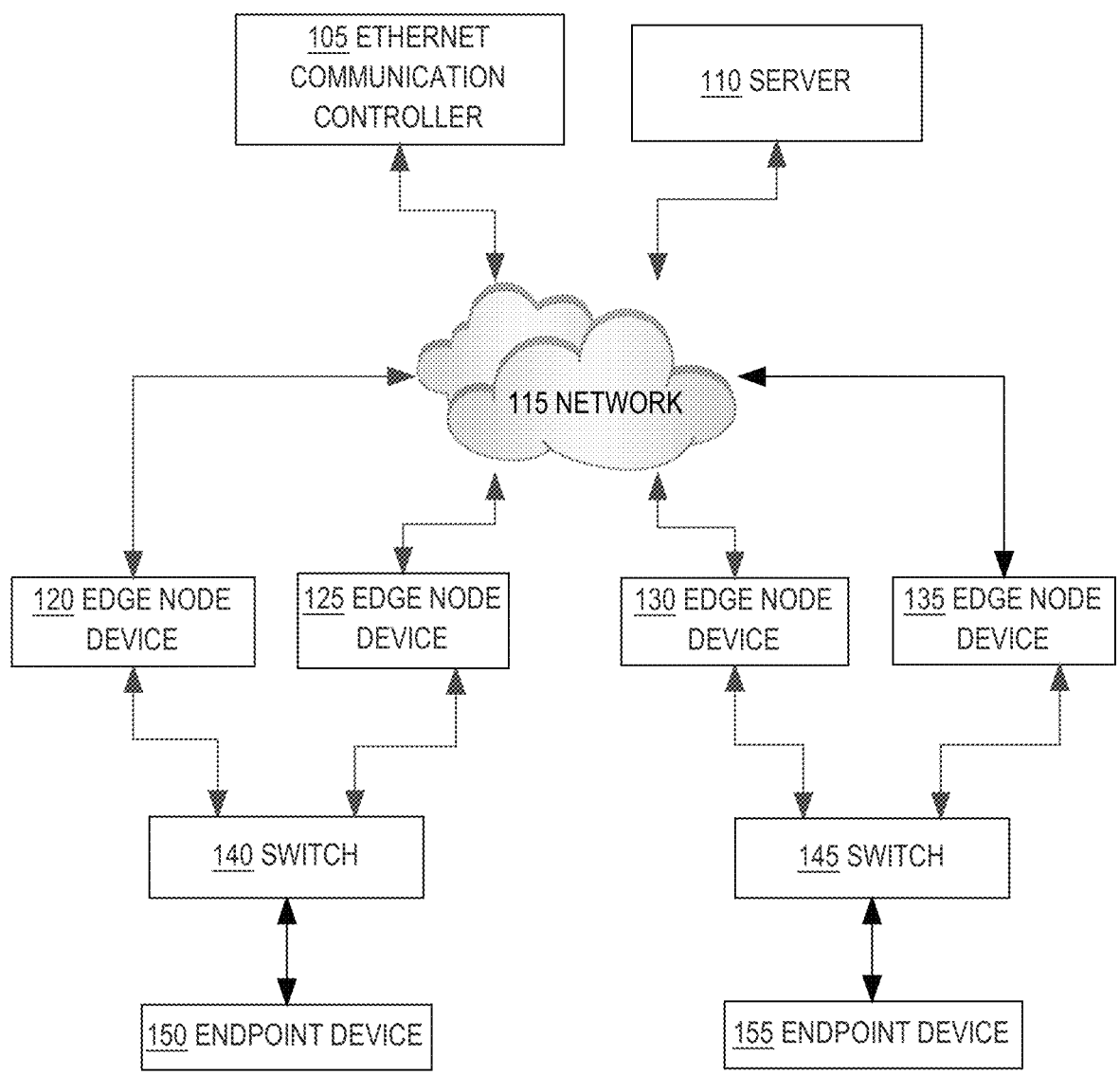
FIG. 1 depicts a networked computer system, in an example embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein in sections according to the following outline:

| | |
|---|---|
| 1.0 | GENERAL OVERVIEW |
| 2.0 | STRUCTURAL OVERVIEW |
| 3.0 | FUNCTIONAL OVERVIEW |
| 4.0 | PROCEDURAL OVERVIEW |
| 5.0 | HARDWARE OVERVIEW |

1.0 General Overview

According to various embodiments, methods and systems are provided that enable improved computer processing and network efficiency by using In-situ OAM headers to facilitate communication between IoT devices and improve network monitoring and management. Previous approaches used repeated decapsulation and encapsulation to access necessary forwarding and priority information, and separately used out-of-band channels to send data to network monitoring devices and analytic servers for troubleshooting. However, the present approach uses programmable switches to identify specific packet and frame data from IoT devices and generate an IOAM header that includes the packet and frame data. Since the necessary forwarding and priority data is included in the IOAM header, there is no need for network devices to repeatedly decapsulate and encapsulate, thereby decreasing the use of processing resources. Moreover, since the forwarding and priority data is sent in-band through the IOAM header, no separate out-of-band channel is needed to communicate management data, thereby decreasing the use of network bandwidth.

In an embodiment, a computer implemented method comprises at an internetworking device that is logically located in an edge position with respect to an internet protocol network and a plurality of industrial devices, receiving packet and frame data from a first computing device that is associated with an industrial system and communicates using a device-level Ethernet data communication protocol that does not define a management layer; at the internetworking device, generating an Operations, Administration, Management (OAM) header using, at least in part, the packet and frame data, wherein the OAM header comprises a device identifier, a data type, and a variable; encapsulating the packet and frame data with the OAM header to generate encapsulated packet and frame data; storing the encapsulated packet and frame data in a database; sending the encapsulated packet and frame data to a second internetworking device that is associated with the industrial system and communicates using the device-level Ethernet data communication protocol that does not define a management layer.

In another embodiment, a data processing method providing an improvement in collecting and transmitting data values obtained via the device-level Ethernet data communication protocol to the analytics server computer using management packets is implemented in a networked distributed computer system comprising an analytics server computer, a plurality of industrial Ethernet switch nodes that are logically located at edge positions in relation to an internet protocol network that includes the analytics service computer, and a plurality of different computing devices each communicatively coupled to one of the industrial Ethernet switch nodes, and communicating using a device-level Ethernet data communication protocol that does not define a management layer. The data processing method comprises: at a first industrial Ethernet switch node, receiving packet and frame data from a first computing device that is associated with an industrial system and coupled to the first industrial Ethernet switch node; at the first industrial Ethernet switch node, generating a first Operations, Administration, Management (OAM) header using, at least in part, the packet and frame data, wherein the first OAM header comprises a device identifier, a data type, and a variable; at the first industrial Ethernet switch node, generating a second OAM header comprising a first trace identifier for the first industrial Ethernet switch node; encapsulating the packet and frame data with the first and the second OAM header to generate encapsulated packet and frame data; sending the encapsulated packet and frame data to a second industrial Ethernet switch node that is associated with the industrial system and coupled to a second computing device that communicates using the device-level Ethernet data communication protocol that does not define a management layer; tracking one or more computing devices that process the encapsulated packet and frame data while the encapsulated packet and frame data is being sent to the second computing device by updating the second OAM header with one or more second trace identifiers corresponding to the one or more computing devices; at the second industrial Ethernet switch node, sending the encapsulated packet and frame data with the first trace identifier and the second one or more trace identifiers to the analytics server computer for storing in a database.

In an embodiment, the data processing method may further comprise, at the analytics server computer: receiving path data through streaming telemetry and consolidating the path data using at least the first trace identifier and the second one or more trace identifiers of the second OAM header; receiving and identifying an alarm message based on an alarm data type of the first OAM header and identifying an alarm timestamp associated with the alarm message based on the device identifier of the first OAM header; identifying, using the path data, network events with event timestamps that are within a temporal proximity to the alarm timestamp; correlating the network events using the alarm timestamp and the path data to identify an alarm event as a cause of the alarm message.

2.0 Structural Overview

FIG. 1 depicts a networked computer system, in an example embodiment. In an embodiment, the computer system 100 comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments. A "computer" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, computer network devices such as gateways, modems, routers, access points, switches, hubs, firewalls, and/or any other special-purpose computing devices. Any reference to "a computer" herein may mean one or more computers, unless expressly stated otherwise. The instructions identified above are executable instructions and may comprise one or more executable files or programs that have been compiled or otherwise built based upon source code prepared in JAVA, C++, OBJECTIVE-C or any other suitable programming environment.

In the example of FIG. 1, a networked computer system 100 may facilitate the secure exchange of data between programmed computing devices. Therefore, each of elements 105, 110, 120, 125, 130, 135, 140, 145, 150, and 155 of FIG. 1 may represent one or more computers that are configured to provide the functions and operations that are described further herein in connection with network communication. FIG. 1 depicts only one of many possible arrangements of components configured to execute the programming described herein. Other arrangements may include fewer or different components, and the division of work between the components may vary depending on the arrangement. For example, any number of switches, routers, or other network devices may be used to facilitate communication between any number of endpoint devices. In an embodiment, there may be one or more source endpoint devices operatively connected to switch 140 and one or more destination endpoint devices operatively connected to switch 145. Any number of other switches may be used.

In an embodiment, the networked computer system 100 may be a system of computing devices that use the Process Field Net (PROFINET) protocol, Device Level Ring (DLR) protocol, or any other device-level Ethernet data communication protocol standard for communicating over Industrial Ethernet (IE). In an embodiment, the device-level Ethernet data communication protocol used does not define a management layer. The ethernet communication controller 105 may be, for example, a PROFINET controller, which controls, monitors, and facilitates communication between peripheral PROFINET devices. While FIG. 1 depicts the networked computer system 100 within the context of industrial IoT device communication, the system may be adapted to accommodate communication between any IoT device. Server 110 may be one or more servers, such as one or more analytic servers, configured to monitor network performance and identify and troubleshoot failures in network communication. In an embodiment, server 110 may be configured to signal other computing devices to direct network traffic in accordance with various analytics.

Network 115 broadly represents a combination of one or more local area networks (LANs), wide area networks (WANs), metropolitan area networks (MANs), global interconnected internetworks, such as the public internet, or a combination thereof. Each such network may use or execute stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein may be configured to connect to the network 115 and the disclosure presumes that all elements of FIG. 1 are communicatively coupled via network 115.

Edge node device 120, 125, 130, 135 may be any edge network device, such as routers or switches. Switch 140, 145 may be an internetwork computing device configured to receive, process, and send data. Specifically, switch 140, 145 nodes may be configured as a virtual extensible local area network (VxLAN) tunnel endpoint (VTEP) that encapsulate and decapsulate data, and generate and store OAM headers in accordance with the OAM protocol. The OAM protocol is a protocol for installing, monitoring, and troubleshooting ethernet networks by using a sublayer in the data link layer of the OSI model. In an embodiment, the switch 140, 145 may be an OAM-compatible IE switch that is configured to communicate using any device-level Ethernet data communication standard, such as PROFINET. The switch 140, 145 is operatively connected to endpoint device 150, 155 which may be any computing device, such as a Programmable Logic Controller (PLC) or any other industrial IoT device.

Figure 2:
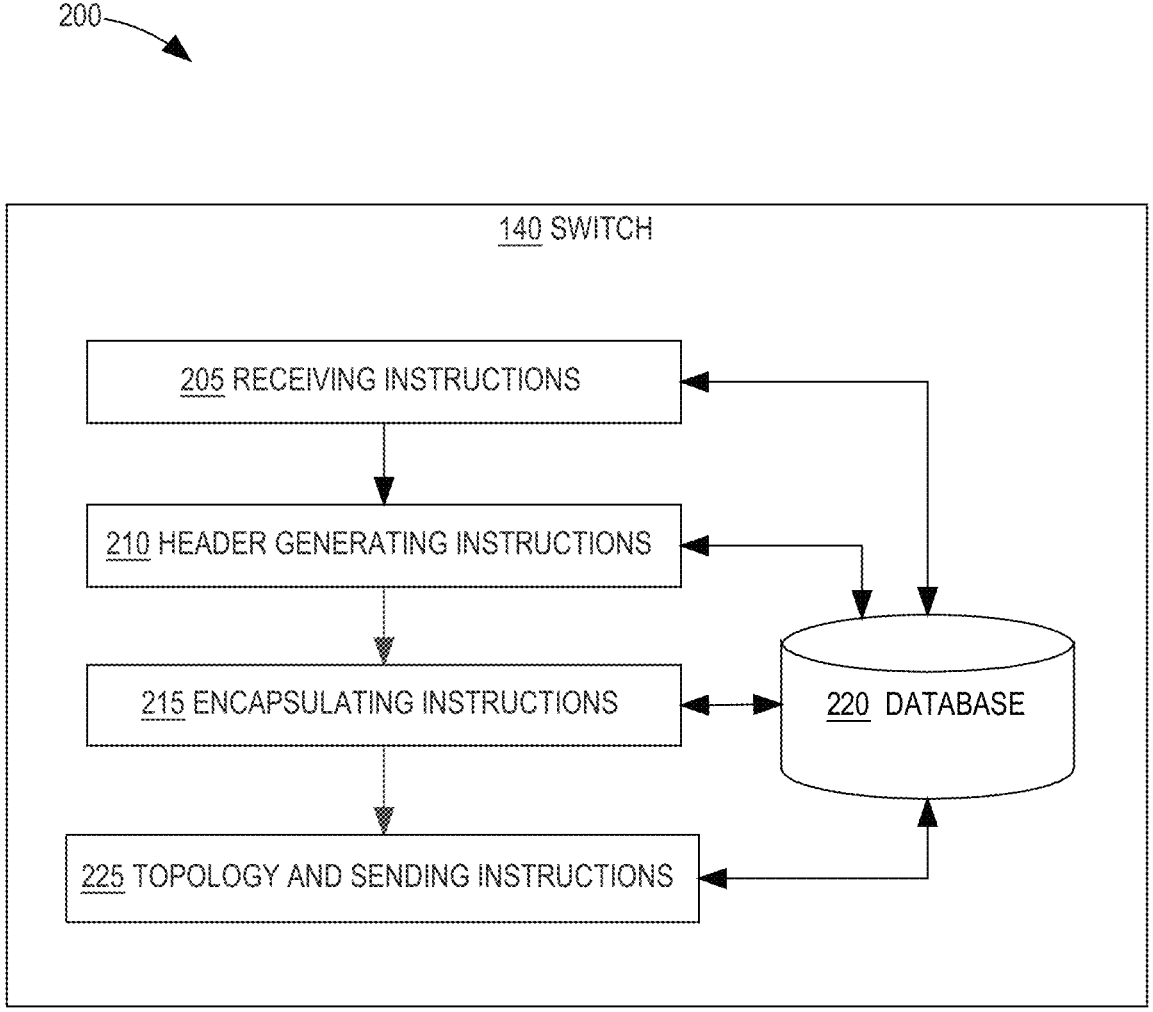
FIG. 2 depicts an internetwork computing device, in an example embodiment.

FIG. 2 depicts an internetwork computing device 200, in an example embodiment. The internetwork computing device 200 may be, for example, switch 140, switch 145, or any other switch configured to communicate using one or more device-level Ethernet data communication protocols.

Each internetwork computing device 200 may be configured with receiving instructions 205 that, when executed, cause the internetwork computing device 200, such as switch 140, 145, to receive packet and frame data. Switch 140, 145 may also be configured with header generating instructions 210 that, when executed, cause the switch 140, 145 to generate OAM headers, as further described herein. Once the OAM headers have been generated, the switch 140, 145 may execute encapsulating instructions 215, which encapsulates the packet and frame data with the OAM headers. The encapsulated packet and frame data may subsequently be stored in a database 220 associated with the switch 140, 145. The switch 140, 145 may then execute topology and sending instructions 225 to send the encapsulated packet and frame data to server 110 and/or a destination endpoint device 150, 155, in accordance with the network topology. In an embodiment, ethernet communication controller 105, such as a PROFINET controller, may work in conjunction with the switch 140, 145 to control the sending and receiving of packets to and from computing devices.

3.0 Functional Overview

Switch 140, 145 may be configured to receive packet and frame data from a source endpoint device using PROFINET, generate IOAM headers based on the packet and frame data as well as switch data, encapsulate the packet and frame data with the IOAM headers, and subsequently send the encapsulated packet and frame data to a destination endpoint device or an analytics server. Using In-situ OAM headers not only allows for faster and more efficient processing and forwarding of packet and frame data to its intended destination, but it also enables more efficient network monitoring for analytics, diagnostics, and troubleshooting.

The functional specifics of this process are depicted in the example Protocol Data Unit (PDU) workflow of FIG. 3. A PDU is data that is delivered as a unit. A PDU may include OSI layer 1 bits, OSI layer 2 frames, OSI layer 3 packets, and/or OSI layer 4 segments. In the example of FIG. 3, an initial PDU comprises a PROFINET ethernet frame 301 featuring device identification information 302, an ethertype 303, and payload data 304.

In an embodiment, the device identification information 302 may include, for example, a Source Media Access Control (SMAC) address and a Destination Media Access Control (DMAC) address. In the example of FIG. 3, the SMAC address is represented by A while the DMAC address is represented by B. The SMAC may correspond to endpoint device 150 while the DMAC address may correspond to endpoint device 155, for example. Embodiments are depicted in the figures and described herein in the context of an SMAC and DMAC purposes of explanation, but any other type of device identification information 302 may be used.

The payload data 304 may be data representing the intended message that is being sent. The ethertype 303 may be a value that indicates which type of protocol, and therefore, which type of payload data 304, is encapsulated. For example, an ethertype value of 8892 indicates the use of the PROFINET protocol, which means that the payload data 304 is PROFINET data or an alarm that may be time sensitive and should be prioritized. An ethertype value of 0800 indicates the use of the IPv4 protocol, which means that the payload data 304 is network traffic data that may be non-time sensitive and need not be prioritized. An ethertype value of 86DD indicates the use of the IPv6 protocol, which means that the payload data 304 is network traffic data that may also be non-time sensitive and need not be prioritized. Any number of different ethertype values indicating the use of any number of protocols and associated payload data may be used.

At step 310, the ethernet frame 301 is sent from the endpoint device 150 associated with the SMAC address and received by the switch 140 using the receiving instructions 205. Subsequently, the switch 140 may alter the PDU by adding network layer data 311 and an IOAM encapsulation 312. Network layer data 311 broadly represents any network layer data, including any internet protocols that may be used for network communication. The IOAM encapsulation 312 may be an In-situ OAM encapsulation that includes multiple headers. In the example embodiment of FIG. 3, the header generating instructions 310 may generate an IOAM check-sum header 313, an IOAM forwarding and priority header 314, and an IOAM tracing header 315, although any number of different IOAM headers may be generated. Each header is subsequently included in the IOAM encapsulation 312 using the encapsulating instructions 315.

The IOAM check-sum header 313 may be a header that indicates the beginning of IOAM data and may be used for data integrity checks, in an embodiment. The IOAM forwarding and priority header 314 may be a header that includes forwarding and priority data that is at least partially obtained from the ethernet frame 301. In the example of FIG. 3, the IOAM forwarding and priority header 314 includes three data objects: a Device Identifier, a Data Type, and a Variable. While FIG. 3 depicts three data objects, the IOAM forwarding and priority header 314 may be adapted to accommodate any number of data objects.

Specifically, the Device Identifier data object of the IOAM forwarding and priority header 314 may include a series of identification information, including but not limited to the connected switch 140 identifier, the connected port number, associated timestamps, and the source device identifier of the source endpoint device 150, such as the MAC address or IP address. The source device identifier of the Device Identifier data object may be derived from the device identification information 302 of the ethernet frame 301. For example, the device identification information 302 of FIG. 3 indicates that the SMAC address is A. The header generating instructions 210, when executed, may use SMAC address A from the ethernet frame 301 to generate the source device identification of A that is included with the Device Identifier. Although not depicted in FIG. 3, the Device Identifier of the IOAM forwarding and priority header 214 may also include the connected switch 140 identifier, the connected port number, and ingress and egress timestamps, which the header generating instructions 310 may generate based on information from the switch 140, in an example embodiment.

The Data Type data object may be a value that indicates what type of data is being sent. For example, the value may indicate whether the type of data is a time sensitive alarm, time sensitive data, or non-time sensitive data based on the ethertype 303 from the ethernet frame 301. For example, if the ethertype 303 has a value that indicates the use of an IP protocol for communicating IP or non-critical data, then the Data Type may be set to non-time sensitive data value. However, if the ethertype 303 has a value that indicates the use of a non-IP protocol for communicating non-IP or critical data, then the Data Type may be set to a value indicating time-sensitive data. In the example of FIG. 3, the ethertype 303 value is 8892, which indicates that the PROFINET protocol is being used to communicate PROFINET data in real time. Since PROFINET data is considered critical and time-sensitive, the header generating instructions 310, when executed, may use the ethertype 303 value of 8892 to generate a Data Type that is set to a time sensitive data value and included in the IOAM forwarding and priority header 214. Since a time sensitive alarm that is sent in real time may also have an ethertype 303 value of 8892, the switch 140, 145 may be configured to perform a deep packet inspection (DPI) to differentiate between a time sensitive alarm and time sensitive data. Based on the DPI, the Data Type data object may be set to a time sensitive alarm value or a time sensitive data value.

The Variable data object is customizable variable that may be a value representing any additional information that may be used for analytics, visualizations, and real-time and proactive decision, or any other purpose. For example, the Variable may be incoming port numbers, vLAN tags, additional timestamps, custom metadata such as geo-location data, or any other information. In the example of FIG. 3, the Variable value is represented by X.

Generating the IOAM forwarding and priority header 314 and including information such as the Device Identifier, Data Type, and Variable in the header makes difficult-to-access data more readily accessible to devices that are OAM-compatible. Specifically, including data in the IOAM forwarding and priority header 314 allows OAM-compatible devices to access the forwarding and priority data without having to decapuslate and encapsulated, which allows for more efficient network communication that decreases the use of processing resources. Also, since the original forwarding and priority data is still available as part of the ethernet frame 301, or otherwise accessible from the switch 140, 145 or other networking devices, any devices that are not compatible with OAM may still use traditional decapsulation and encapsulation to access the same data. Therefore, the use of the IOAM forwarding and priority header 314 also allows for backwards compatibility.

The IOAM forwarding and priority header 314 also has the benefit of conveying information in-band as opposed to out-of-band. This enables analytic or troubleshooting devices, such as server 110, to track and evaluate network performance and identify issues without using out-of-band channels, thereby significantly decreasing the use of network bandwidth.

The IOAM tracing header 315 may be a header configured to record the identity of all the network devices that process any given packet as it traverses the network 115 in sequential order. In the example of FIG. 3, the IOAM tracing header 315 includes the identity of the switch 140 as SWITCH 1. In an embodiment, the IOAM tracing header 315 may also include timestamps, ingress and egress port numbers, and other OAM details for each hop.

At step 320, the PDU comprising the ethernet frame 301, IOAM encapsulation 312, and the network layer data 311 is sent through the network using the topography and sending instructions 225. In an embodiment, the ethernet communication controller 105 works in conjunction with the switch 140 to direct the packet to its proper destination. The packet is processed by multiple internetworking devices, including fog edge nodes (FEN) such as switches and routers, servers and so forth before the packet reaches a destination computing device.

An updated IOAM tracing header 321 may include a trace identifier of each computing device or node that processed the packet, as well as timestamps, ingress and egress interface identifiers, ingress and egress port numbers, application metadata, and other OAM details for each hop. In the example of FIG. 3, the updated IOAM tracing header 321 includes a record of hops to each device that processed the packet in sequential order, including SWITCH 1 as the first hop, FEN 1 as the second hop, CORE 1 as the third hop, FEN 2 as the fourth hop, and SWITCH 2 as the fifth hop. In an embodiment, SWITCH 1 and SWITCH 2 may be IE switches, FEN 1 and FEN 2 may be any fog edge node computing device, such as industrial controllers, switches, routers, embedded servers, or cameras, and CORE 1 may be a server core. The record of hops indicates a path taken by the particular packet as it traversed the network 115. While five hops are depicted in FIG. 3, the updated IOAM tracing header 321 may generate a record of any number of hops to any number of devices, any type of device, and through any path as a packet traverses the network 115. This allows for network monitoring and troubleshooting since packets paths can be traced through the network 115, as further described herein.

In an embodiment, the PDU with the updated IOAM tracing header 321 may be saved in a database 220 associated with a switch 145 that processes the packet just prior to its arrival at a destination computing device, such as endpoint device 155. The PDU with the updated IOAM tracing header 321 may also be sent to server 110 for analytic purposes. In the example of FIG. 3, SWITCH 2 may save the PDU with the updated IOAM tracing header 321 in a database 220 and subsequently send the data to server 110 using the topology and sending instructions 225.

4.0 Procedural Overview

FIG. 4A and FIG. 4B depict a method or algorithm 400 for applying IOAM to Ethernet communication, in an example embodiment. FIG. 4A and FIG. 4B are described at the same level of detail that is ordinarily used, by persons of skill in the art to which this disclosure pertains, to communicate among themselves about algorithms, plans, or specifications for other programs in the same technical field. While the algorithm or method of FIG. 4A and FIG. 4B shows a plurality of steps for applying IOAM to device communication, the algorithm or method described herein may be performed using any combination of one or more steps of FIG. 4A and FIG. 4B in any order, unless otherwise specified.

In an embodiment, the method or algorithm 400 begins with step 402. At step 402, internetworking device, such as switch 140, which is located at the edge with respect to network 115 and various industrial device, executes receiving instructions 205 to receive packet and frame data from a first computing device, such as endpoint device 150. The endpoint device 150 may be associated with an industrial system and communicates using a device-level Ethernet data communication protocol that does not define a management layer. For example, endpoint device 150 may use PROFINET or DRL to send packet and frame data to the switch 140. The switch 140 may receive the packet and frame data using the receiving instructions 205. The packet and frame data may include, for example, the ethernet frame 301 featuring device identification information 302, ethertype 303, and payload data 304.

Subsequently, at step 404, the switch 140 executes the header generating instructions 210 to generate an OAM header using, at least in part, the packet and frame data, wherein the OAM header comprises a device identifier, a data type, and a variable. In an embodiment, the header generating instructions 210 may, when executed, cause the switch 140 to identify the device identification information 302 from the ethernet frame 301. The header generating instructions 210 may then generate the Device Identifier data object of the IOAM forwarding and priority header 314 using this device identification information 302. Specifically, the device identification information 302 may be included in the IOAM forwarding and priority header 310 as the source device identifier in the Device Identifier data object. Information from the switch 140 may also be included in the IOAM forwarding and priority header 314 as, for example, a connected switch identifier, a connected port number, and associated timestamps in the Device Identifier data object.

In an embodiment, the header generating instructions 210 may also cause the switch 140 to identify the ethertype 303 from the ethernet frame 301. The ethertype 303 may be used to generate the Data Type data object of the IOAM forwarding and priority header 314. Specifically, the header generating instructions 210 may use the ethertype 303 to determine the value of the Data Type, such as whether the Data Type is a time sensitive alarm, time sensitive data, or non-time sensitive data. An ethertype 303 that indicates the use of an IP protocol for communicating IP or non-critical data, may result in the header generating instructions 210 generating a non-time sensitive value for the Data Type. An ethertype 303 that indicates the use of a non-IP protocol for communicating non-IP or critical data, such as real-time signals for control of PLCs and/or alarms, may result in the header generating instructions 210 generating a time-sensitive value for the Data Type. In another embodiment, the switch 140 may be configured differentiate between a time sensitive alarm and time sensitive data. For example, the switch may be configured to perform DPI identify the type of data and generate an appropriate value for the Data Type data object.

The header generating instructions 210 may also generate the Variable data object of the IOAM forwarding and priority header 314 using any available information. For example, the header generating instructions 210 may include incoming port numbers, vLAN tags, additional timestamps, custom metadata such as geo-location data, or any other information in the Variable data object of the IOAM forwarding and priority header 314.

In addition to the IOAM forwarding and priority header 314, the header generating instructions 210 may also generate the IOAM check-sum header 313 for data integrity checks and the IOAM tracing header 315 to track each computing device that processes the packet and associated timestamps, as further described herein.

Once the IOAM headers have been generated, at step 406, the switch 140 executes the encapsulating instructions 215 to encapsulate the packet and frame data with the OAM headers and generate encapsulated packet and frame data. For example, the encapsulating instructions 215 may encapsulate the packet and frame data with the IOAM check-sum header 313, the IOAM forwarding and priority header 314, and the IOAM tracing header 315 to generate the IOAM encapsulation 312. Network layer encapsulation options may include, for example, IPv6, Virtual Extensive Local Area Network (VxLAN) Generic Protocol Extension (GPE), SRv6, Network Services Headers (NSH), IPv4, Multiprotocol Label Switching (MPLS), or any other protocol.

At step 408, the switch 140 may store the encapsulated packet and frame data in database 220 prior to sending. In an embodiment, the switch 140 may also execute the topology and sending instructions 225 to send the encapsulated packet and frame data to server 110 for storing in a database associated with the server 110.

At step 410, the switch 140 may execute the topology and sending instructions 225 to send the encapsulated packet and frame data that is stored in database 220 to a destination computing device, such as another endpoint device 155, the ethernet communication controller 105, or any other computing device. For example, the switch 140 uses the topology and sending instructions 225 to send the entire PDU featuring the ethernet frame 301, the IOAM encapsulation 312, and the network layer data 311 to endpoint device 155. In an embodiment, the switch 140 may work in conjunction with the ethernet communication controller 105 to send the packet using the PROFINET protocol.

As the data traverses the network 115, the IOAM tracing header 315 is updated to include trace identifiers of every computing device that processes the packet. For example, each edge node device 120, 125, 130, 135 and each switch 140, 145 that processes the packet as the packet traverses the network 115 may add a unique identifier associated with the edge node device 120, 125, 130, 135 and switch 140, 145 to the IOAM tracing header to generate an updated IOAM tracing header 321. In an embodiment, the IOAM tracing header 321 may also include timestamps, ingress and egress interface identifiers, ingress and egress port numbers, application metadata, and other OAM details for each hop. This enables the IOAM tracing header 315 and updated IOAM tracing header 321 to track the packet route or path through the network 115 for network monitoring and evaluation. In an embodiment, any subsequent switch 145 that processes a packet before the packet reaches a destination endpoint device 155 may receive and store the PDU with the updated IOAM tracing header 321 in database 220. In another embodiment, the switch 145 may send the PDU with the updated IOAM tracing header 321 to a server 110 for storing in a database associated with the server 110.

In an embodiment, any encapsulated packet and frame data that is stored in database 220 may be sent to the server 110 for network analysis, monitoring, and troubleshooting purposes. This includes packet and frame data processed at, for example, switch 140 with an IOAM tracing header 315, as well as packet and frame data processed at switch 145 with an updated IOAM tracing header 321. For example, server 110 may be an analytics server that is configured to periodically request network traffic information from each switch 140, 145 for monitoring and troubleshooting. Each switch 140, 145 may use receiving instructions 205 to receive the request, access the encapsulated packet and frame data that is stored in database 220 and use the topology and sending instructions 225 to send the data to the server 110. In another embodiment, each switch 140, 145 may be configured to automatically send encapsulated packet and frame data based on a predetermined schedule. For example, each switch 140 may use the topology and sending instructions 225 to automatically send the data in accordance with any predetermined period of time. In an embodiment, the server 110 may receive data through streaming telemetry where data is streamed from devices continuously with incremental updates.

The server 110 may subsequently use the data provided in the IOAM encapsulation 312 to monitor and troubleshoot network issues. The algorithm or method 400 may continue with step 412 of FIG. 4B. In an embodiment, the server 110 may receive numerous PDUs from computing devices throughout the network through streaming telemetry, for example. Collectively, the PDUs may provide path data that trace the different paths that packets take throughout the network 115.

In an embodiment, server 110 may evaluate the various IOAM headers of the PDUs and use the information to consolidate path data and determine patterns in network communication. For example, server 110 may receive a series of PDUs with updated IOAM tracing headers 321 that each indicate that the packets were sent along the same path between a source endpoint device 150 and destination endpoint device 155. The path may be the path indicated in FIG. 3, for example, where SWITCH 1 is the first hop, FEN 1 is the second hop, CORE 1 is the third hop, FEN 2 is the fourth hop, and SWITCH 2 is the fifth hop. Timestamps, ingress and egress interface identifiers, ingress and egress port numbers, application metadata, and other OAM details may also be included in each updated IOAM tracing header 321. Server 110 may store this particular path or any other patterns of network traffic with all associated path data obtained through OAM in a database associated with the server 110.

Server 110 may also be configured to identify and troubleshoot network failures using the consolidated path data. In an embodiment, at step 414, server 110 may receive data featuring an alarm message that is generated in response to an alarm event. For example, if a switch 140, 145 processes a packet with a Data Type value that corresponds to a time-sensitive alarm, then the switch 140, 145 may save the data in database 220, as described herein, and send the data to server 110. Server 110 may be configured to recognize incoming alarm messages using the Data Type data object in the IOAM forwarding and priority header 314.

Upon receiving the data and identifying the Data Type as an alarm message, server 110 may subsequently identify a timestamp associated with the alarm message. For example, server 110 may identify the timestamp stored in the Device Identifier data object of the IOAM forwarding and priority header 314, timestamps stored in the IOAM tracing header 315 and updated IOAM tracing header 321, or any other timestamps. At step 416, server 110 may compare the timestamp of the alarm message to all other timestamps from path data that was received and identify timestamps that are within temporal proximity to the timestamp of the alarm message. At step 418, server 110 may correlate network events using the alarm timestamp and the path data to identify the cause of the alarm message and the network failure. The cause of the alarm message may include, for example, component failures, security failures, network traffic congestion, and/or any other source of network issues.

For example, if the alarm message has a timestamp in the IOAM forwarding and priority header 314 indicating that a switch 145 received the alarm message at exactly 08:00:00 on a particular date, then server 110 may identify all received path data featuring timestamps of at or near 08:00:00 on that particular date. In some embodiments, the timestamps may be at exactly 08:00:00, before 08:00:00, after 08:00:00, or any combination thereof. Server 110 may use these timestamps and path data to trace communications between devices, determine particular paths that are affected or unaffected by the alarm event, determine the last known working timestamp along affected paths, determine one or more network events as alarm events that caused the alarm message, determine the MAC address, IP address, or device identification of any problematic devices, and/or conduct any other troubleshooting and network management activities.

For example, if server 110 receives an alarm message and determines that packets being sent from endpoint device 150 to endpoint device 155 are not being received when traveling through edge node device 135, but are being received when traveling through edge node device 130, the server 110 may determine that a failure of edge node device 135 may be the caused the alarm message.

In an embodiment, server 110 may determine one or more unaffected paths using the path data and signal the switches and edge node devices to direct network traffic along the one or more unaffected paths to avoid an alarm event. In the example above, if server 110 determines that a failure of edge node device 135 is the root cause of the alarm message and that a path from endpoint device 150 to endpoint device 155 through edge node device 130 has not been affected by the failure of edge node device 135, then server 110 may send a signal to the switch 145 and/or the edge node device 130 to redirect traffic along the unaffected path.

In another embodiment, server 110 may determine one or more affected paths using the path data and signal the switches and/or edge node devices to direct network traffic to avoid the one or more affected paths. In the example above, if server 110 determines that edge node device 135 is the root cause of the alarm message and that the path to endpoint device 155 through edge node device 135 has been affected, then server 110 may send a signal to the switch 145 and/or the edge node device 130 to take any other available path in order to avoid the affected path.

In another embodiment, server 110 may predict future alarm events based on the one or more affected paths and proactively mediate the effects of these alarm events. For example, a variety of machine learning techniques, such as neural networks, clustering, Bayesian networks, or any other machine learning technique, may be used to evaluate a history of the path data and identify patterns in network events and failure parameters that negatively affect various paths. Server 110 may store these patterns and parameters in an associated database and anticipate future alarm events based on these patterns and parameters. For example, server 110 may use machine learning to predict that edge node device 135 fails under a certain set of conditions or parameters, which affects the path from endpoint device 150 to endpoint device 155 through edge node device 135. Upon recognizing the presence of these conditions or parameters, server 110 may proactively send a signal to the switch 145 and/or the edge node device 130 to redirect network traffic and avoid the path from endpoint device 150 to endpoint device 155 through edge node device 135, thereby avoiding the edge node device 135 failure.

Using the foregoing techniques, programmed computing devices may use one or more OAM headers to make forwarding and priority data accessible without the need for repeated decapsulation and encapsulation, which has the benefit of improving data delivery and processing resource usage. The approaches disclosed herein enables the gathering of telemetry and OAM information along the path within the data packet itself, through the use of OAM headers.

The approaches disclosed herein have the additional benefit of improving network bandwidth usage. By sending the forwarding and priority data in-band, there is a significant drop in the use of separate out-of-band channel communication for sending diagnostic, monitoring, and troubleshooting data, which decreases the use of network bandwidth. Furthermore, the approaches disclosed herein allow for backwards compatibility. The use of OAM headers does not preclude computing devices that are not OAM compatible from obtaining forwarding and priority data through traditional decapsulation and encapsulation means. Moreover, the approaches disclosed herein have the additional benefit of improving network monitoring, troubleshooting, and failure prediction and avoidance through the use of an analytic server that evaluates network issues, predicts future network issues, and avoids the future network issues.

5.0 Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
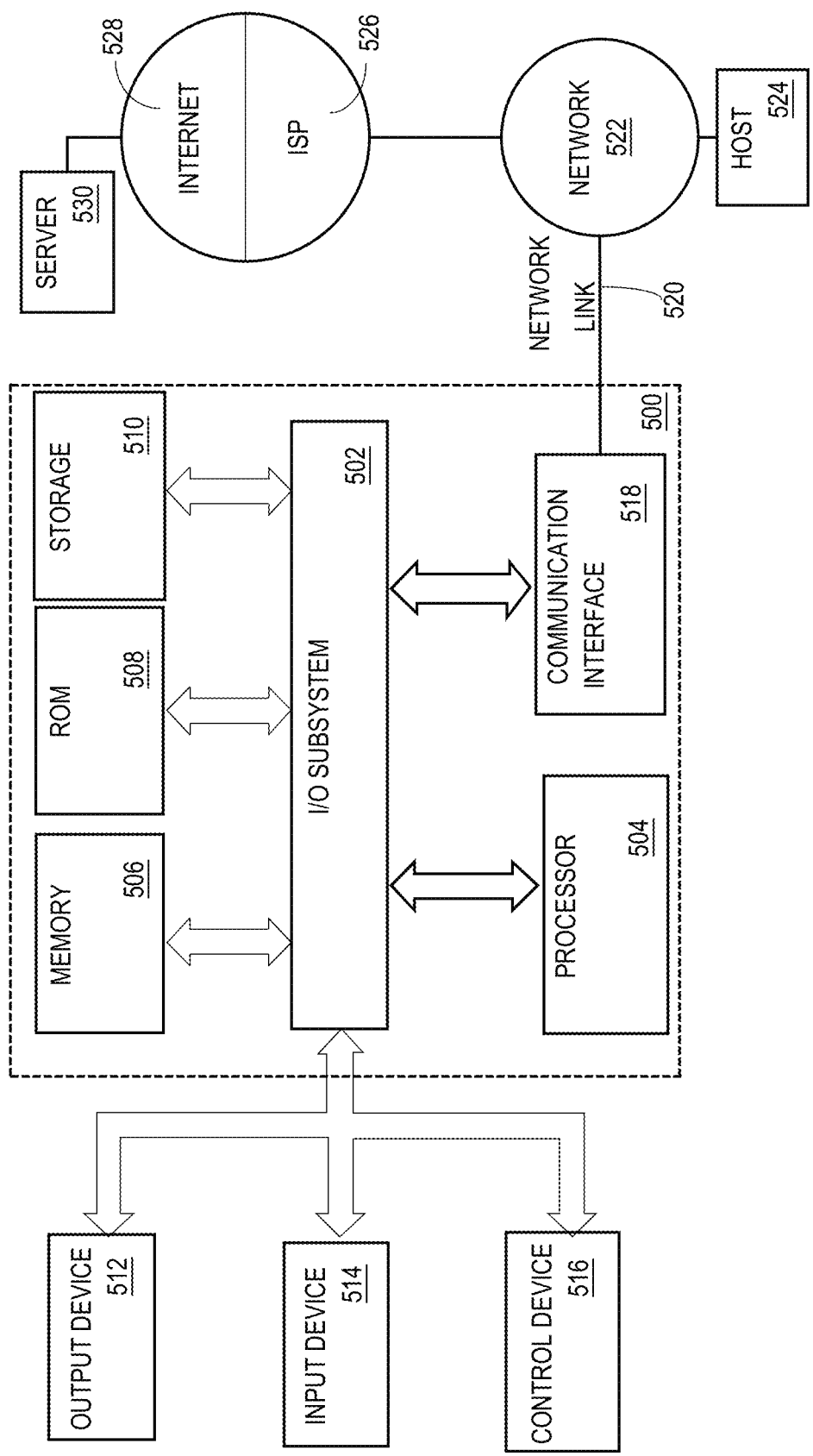
FIG. 5 depicts a computer system upon which an embodiment of the invention may be implemented.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM, and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A computer-implemented method, comprising:
at an internetworking device that is logically located in an edge position with respect to an internet protocol network and a plurality of industrial devices, receiving packet and frame data from a first computing device that is associated with an industrial system and communicates using a device-level Ethernet data communication protocol that does not define a management layer;

at the internetworking device, determining a data type value for an Operations, Administration, Management (OAM) header using an Ethertype value obtained from the packet and frame data, wherein the data type value is indicative of whether the packet and frame data are time-sensitive;

at the internetworking device, generating the OAM header using, at least in part, the packet and frame data, wherein the OAM header comprises a device identifier, the data type, and a variable;

encapsulating the packet and frame data with the OAM header to generate encapsulated packet and frame data;

storing the encapsulated packet and frame data in a database; and sending the encapsulated packet and frame data to a second internetworking device that is associated with the industrial system and communicates using the device-level Ethernet data communication protocol that does not define a management layer.

2. The computer-implemented method of claim 1, further comprising:
tracking one or more computing devices that process the encapsulated packet and frame data while the encapsulated packet and frame data is being sent to a second computing device.

3. The computer-implemented method of claim 1, wherein the device identifier comprises a switch identifier, a port identifier, and a source device identifier.

4. The computer-implemented method of claim 1, further comprising:
generating the device identifier using, at least in part, a Media Access Control (MAC) address or an Internet Protocol (IP) address of the first computing device.

5. The computer-implemented method of claim 1, wherein the device-level Ethernet data communication protocol is any of Device-Level Ring (DLR) protocol or PROFINET protocol.

6. The computer-implemented method of claim 1, wherein the internetworking device is an industrial Ethernet switch.

7. One or more non-transitory computer-readable media storing instructions which, when processed by one or more processors, cause:
at an internetworking device that is logically located in an edge position with respect to an internet protocol network and a plurality of industrial devices, receiving packet and frame data from a first computing device that is associated with an industrial system and communicates using a device-level Ethernet data communication protocol that does not define a management layer;

at the internetworking device, determining a data type value for an Operations, Administration, Management (OAM) header using an Ethertype value obtained from the packet and frame data, wherein the data type value is indicative of whether the packet and frame data are time-sensitive;

at the internetworking device, generating the OAM header using, at least in part, the packet and frame data, wherein the OAM header comprises a device identifier, the data type, and a variable;

encapsulating the packet and frame data with the OAM header to generate encapsulated packet and frame data;

storing the encapsulated packet and frame data in a database; and sending the encapsulated packet and frame data to a second internetworking device that is associated with the industrial system and communicates using the device-level Ethernet data communication protocol that does not define a management layer.

8. The one or more non-transitory computer-readable media of claim 7, further comprising additional instructions which, when processed by the one or more processors, cause:
tracking one or more computing devices that process the encapsulated packet and frame data while the encapsulated packet and frame data is being sent to a second computing device.

9. The one or more non-transitory computer-readable media of claim 7, wherein the device identifier comprises a switch identifier, a port identifier, and a source device identifier.

10. The one or more non-transitory computer-readable media of claim 7, further comprising additional instructions which, when processed by the one or more processors, cause:
generating the device identifier using, at least in part, a Media Access Control (MAC) address or an Internet Protocol (IP) address of the first computing device.

11. The one or more non-transitory computer-readable media of claim 7, wherein the device-level Ethernet data communication protocol is any of Device-Level Ring (DLR) protocol or PROFINET protocol.

12. The one or more non-transitory computer-readable media of claim 7, wherein the internetworking device is an industrial Ethernet switch.

13. A data processing apparatus, comprising:
a processor;
a memory associated with the processor and storing instructions that, when executed, cause:
at an internetworking device that is logically located in an edge position with respect to an internet protocol network and a plurality of industrial devices, receiving packet and frame data from a first computing device that is associated with an industrial system and communicates using a device-level Ethernet data communication protocol that does not define a management layer;

at the internetworking device, determining a data type value for an Operations, Administration, Management (OAM) header using an Ethertype value obtained from the packet and frame data, wherein the data type value is indicative of whether the packet and frame data are time-sensitive;

at the internetworking device, generating the OAM header using, at least in part, the packet and frame data, wherein the OAM header comprises a device identifier, the data type, and a variable;

encapsulating the packet and frame data with the OAM header to generate encapsulated packet and frame data;

storing the encapsulated packet and frame data in a database; and sending the encapsulated packet and frame data to a second internetworking device that is associated with the industrial system and communicates using the device-level Ethernet data communication protocol that does not define a management layer.

14. The apparatus of claim 13, wherein the memory further stores additional instructions which, when processed by the one or more processors, cause:

tracking one or more computing devices that process the encapsulated packet and frame data while the encapsulated packet and frame data is being sent to a second computing device.

15. The apparatus of claim 14, wherein the device identifier comprises a switch identifier, a port identifier, and a source device identifier.

16. The apparatus of claim 15, wherein the memory further stores additional instructions which, when processed by the one or more processors, cause:
generating the device identifier using, at least in part, a Media Access Control (MAC) address or an Internet Protocol (IP) address of the first computing device.

17. The apparatus of claim 16, wherein the device-level Ethernet data communication protocol is any of Device-Level Ring (DLR) protocol or PROFINET protocol.

18. In a networked distributed computer system comprising an analytics server computer, a plurality of industrial Ethernet switch nodes that are logically located at edge positions in relation to an internet protocol network that includes the analytics service computer, and a plurality of different computing devices each communicatively coupled to one of the industrial Ethernet switch nodes, and communicating using a device-level Ethernet data communication protocol that does not define a management layer, a data processing method providing an improvement in collecting and transmitting data values obtained via the device-level Ethernet data communication protocol to the analytics server computer using management packets, the method comprising:
at a first industrial Ethernet switch node, receiving packet and frame data from a first computing device that is associated with an industrial system and coupled to the first industrial Ethernet switch node;
at the first industrial Ethernet switch node, determining a data type value for an Operations, Administration, Management (OAM) header using an Ethertype value obtained from the packet and frame data, wherein the data type value is indicative of whether the packet and frame data are time-sensitive;
at the first industrial Ethernet switch node, generating the OAM header using, at least in part, the packet and frame data, wherein the first OAM header comprises a device identifier, the data type, and a variable;
at the first industrial Ethernet switch node, generating a second OAM header comprising a first trace identifier for the first industrial Ethernet switch node;
encapsulating the packet and frame data with the first and the second OAM header to generate encapsulated packet and frame data;
sending the encapsulated packet and frame data to a second industrial Ethernet switch node that is associated with the industrial system and coupled to a second computing device that communicates using the device-level Ethernet data communication protocol that does not define a management layer;
tracking one or more computing devices that process the encapsulated packet and frame data while the encapsulated packet and frame data is being sent to the second computing device by updating the second OAM header with one or more second trace identifiers corresponding to the one or more computing devices; and
at the second industrial Ethernet switch node, sending the encapsulated packet and frame data with the first trace identifier and the second one or more trace identifiers to the analytics server computer for storing in a database.

19. The data processing method of claim 18, wherein the device-level Ethernet data communication protocol is any of Device-Level Ring (DLR) protocol or PROFINET protocol.

20. The data processing method of claim 18, wherein each of the industrial Ethernet switch nodes is configured as a virtual extensible local area network (VxLAN) tunnel endpoint (VTEP) and the encapsulation comprises any of VxLAN or SRv6 encapsulation.

21. The data processing method of claim 18, further comprising, at the analytics server computer:
receiving path data through streaming telemetry and consolidating the path data using at least the first trace identifier and the second one or more trace identifiers of the second OAM header;
receiving and identifying an alarm message based on an alarm data type of the first OAM header and identifying an alarm timestamp associated with the alarm message based on the device identifier of the first OAM header;
identifying, using the path data, network events with event timestamps that are within a temporal proximity to the alarm timestamp; and
correlating the network events using the alarm timestamp and the path data to identify an alarm event as a cause of the alarm message.

22. The data processing method of claim 21, further comprising:
in response to identifying the alarm event, determining one or more unaffected paths that are unaffected by the alarm event using the path data; and
signaling one or more of the plurality of industrial Ethernet switch nodes to redirect network traffic along the one or more unaffected paths.

23. The data processing method of claim 21, further comprising:
in response to identifying the alarm event, determining one or more affected paths that are affected by the alarm event using the path data; and
signaling one or more of the plurality of industrial Ethernet switch nodes to redirect network traffic to avoid the one or more affected paths.

24. The data processing method of claim 23, further comprising:
predicting future alarm events based on the one or more affected paths using one or more parameters; and
in response to determining the presence of the one or more parameters indicating a future alarm event, signaling one or more of the plurality of industrial Ethernet switch nodes to redirect network traffic to avoid the future alarm event.

* * * * *